(12) United States Patent
Ebert et al.

(10) Patent No.: US 7,926,689 B2
(45) Date of Patent: Apr. 19, 2011

(54) ADJUSTABLE CLIP ADVANCE

(75) Inventors: Detlef Ebert, Bad Nauheim (DE);
Michael Hummel, Raunheim (DE)

(73) Assignee: Poly-Clip System GmbH & Co. KG (DE)

( * ) Notice: Subject to any disclaimer, the term of this patent is extended or adjusted under 35 U.S.C. 154(b) by 291 days.

(21) Appl. No.: 12/048,643

(22) Filed: Mar. 14, 2008

(65) Prior Publication Data
US 2008/0223694 A1    Sep. 18, 2008

(30) Foreign Application Priority Data

Mar. 16, 2007    (DE) .................... 10 2007 012 778

(51) Int. Cl.
*G03B 1/22*    (2006.01)
(52) U.S. Cl. ............. 226/73; 226/65; 226/72; 198/723
(58) Field of Classification Search .......... 198/723; 226/64, 65, 72, 73
See application file for complete search history.

(56) References Cited

U.S. PATENT DOCUMENTS

| 2,233,839 | A | * | 3/1941 | Heurtier ................. 226/54 |
| 2,404,875 | A | * | 7/1946 | Worrall .................. 226/57 |
| 2,420,444 | A | * | 5/1947 | Ress ..................... 226/72 |
| 2,506,649 | A | * | 5/1950 | Reeves ................... 226/56 |
| 3,612,370 | A | * | 10/1971 | Thevenaz ............... 226/51 |
| 3,612,371 | A | * | 10/1971 | Katsuyama ............ 226/62 |
| 3,740,129 | A | * | 6/1973 | Lecoeur ................. 352/193 |
| 4,257,328 | A | * | 3/1981 | Gavit .................... 101/292 |
| 4,357,082 | A | * | 11/1982 | Amesbury ............. 352/78 R |
| 4,402,581 | A | * | 9/1983 | Bauer ................... 352/192 |
| 4,534,630 | A | * | 8/1985 | Williamson ........... 352/194 |
| 4,896,960 | A | * | 1/1990 | Williamson ........... 352/193 |
| 6,871,474 | B2 | * | 3/2005 | Topfer ................... 53/138.4 |
| 2003/0005664 | A1 | | 1/2003 | Topfer |

FOREIGN PATENT DOCUMENTS

| DE | 203 14 562 U1 | 1/2004 |
| EP | 1 428 760 A1 | 3/2003 |

* cited by examiner

*Primary Examiner* — Joe Dillon, Jr.
(74) *Attorney, Agent, or Firm* — Hahn Loeser & Parks LLP

(57) ABSTRACT

The invention concerns a clip conveyor apparatus for conveying a clip line (2) comprising a plurality of clips in a clipping machine, in particular a sausage clipping machine, comprising a drive unit (10) and an advance element (20) which is coupled with its drive end (22) to the drive unit (10) and is drivable by the drive unit (10) in such a way that its conveyor end (24) describes an elliptical path and for stepwise conveyance of the clip line (2) engages into intermediate spaces between two clips of the clip line (2) and conveys same stepwise in the advance direction (V), wherein there is provided an adjusting device (30) having a pivot axis (36) about which the transport element (20) is pivotable and which is adjustable in its position without a tool in such a way that at least one of the axes of the elliptical path described by the conveyor end (24) is variable.

Figure 1:
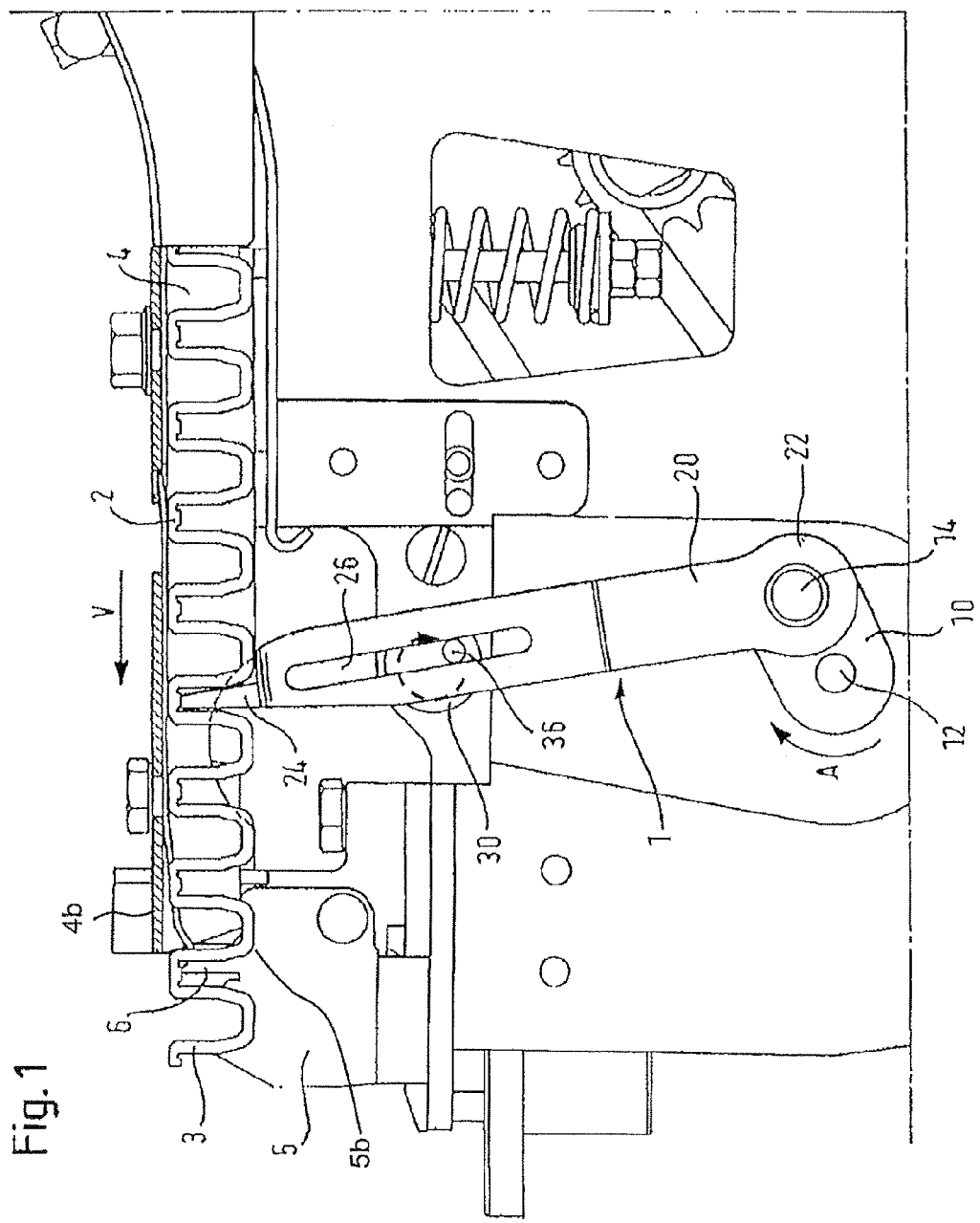

8 Claims, 4 Drawing Sheets

ADJUSTABLE CLIP ADVANCE

This patent application claims priority to German Patent Application DE 10 2007 012 778 4, filed Mar. 16, 2007, which is hereby incorporated herein by reference.

BACKGROUND OF THE INVENTION

The present invention concerns a clip conveyor apparatus for conveying a clip line consisting of a plurality of clips in a clipping machine, in particular a sausage clipping machine.

In particular, the invention concerns a clip conveyor apparatus for conveying a closure clamp line or clip line consisting of a plurality of closure clamps or clips in a clipping machine, in particular a sausage clipping machine, where the clip conveyor apparatus has a drive unit and an advance or transport element. The advance element is coupled with its drive end to the drive unit. In that arrangement, it is drivable by the drive unit in such a way that its conveyor end that is in opposite relationship to the drive end describes an elliptical path and, for stepwise conveyance of the clip line, engages into intermediate spaces between two clips in the clip line and conveys the clip line stepwise in the advance direction.

It is known in practice that, for example, in the production of sausage products, the sausage meat is supplied to a clipping machine from a filling machine by way of a filling tube. In the clipping machine the filling material is introduced into a tubular packaging casing material that is closed at one end by a first clip at the first sausage end and is closed at the second sausage end by fitting a second clip. The packaging casing material of the sausage product produced in this way is then severed from the supply of the rest of the packaging casing material and the finished sausage product is discharged from the clipping machine.

For fitting and closing the closure clamps or the clip the clipping machine usually has a first closure tool, the die, and a second closure tool, the ram. They are arranged between the mouth opening of the filling tube and the transport device of the clipping machine for discharge of the finished sausage products. In that respect the die is usually disposed beneath the conveyor path of the sausage products and the ram is above that conveyor path. After a clip has been placed in the die and a gathered filling material-free plait portion of packaging casing material has been positioned in that clip, the two closure tools are moved towards each other to compress the clip disposed between them and thereby close the packaging casing material.

The clipping machine as described above is typically used to process clips that are made from a stamped aluminum wire line. For that purpose the clips are pre-bent in a U-shape and are joined together by means of legs which are bent over at a right angle at the ends of the limbs of the clips. The clip line formed in that way is fed to the die by a clip conveyor apparatus along a guide path which opens into the region of the associated closure tool.

In the transport or advance movement of a clip line by the clip conveyor apparatuses which are known in practice, the foremost clip, as is known, is fed to the die by an intermittently engaging advance element. As long as the foremost clip is still joined to the subsequent clip line, it is held thereby in the die in a stable condition. In the closure operation the die is firstly moved into its closure position or stroke end position. In that position the foremost clip is pressed against the plait portion of packaging casing material and is gripped between the plait portion and the die.

The ram moves towards the die in time-displaced relationship, that is to say while the die is still remaining in that position. Immediately prior to closure of the clip, the foremost clip is firstly severed from the subsequent clip line by means of a shearing device provided on the ram. At that moment the foremost clip is free and is only still pressed against the die by the tension in the plait portion. The clip is then plastically deformed by the ram further moving towards the die until the closure tools have moved towards each other, down to the height of the clip, and the clip is closed around the plait portion of the tubular casing material.

Such known clip conveyor apparatuses usually have a fixedly set advance stroke movement that is matched to the size of clip. If clips of a different size are to be processed, for example upon a change in the diameter of the sausage products, it is necessary to adapt the advance length or the advance stroke to the new clip size.

In that respect, it is also known in practice in relation to the known clip conveyor apparatuses to use an eccentric to produce the intermittent advance movement. That arrangement provides that a change in the advance stroke or the advance length can be achieved by displacement of the pivot point of the advance element. As the pivot point of the advance element on the die holder or die support is usually fixed, the latter has to be completely changed if a different size of clip is to be processed. This however requires the use of a tool and at least partial dismantling of the clipping machine. This is also time-consuming and thus cost-intensive.

The clip conveyor apparatuses known in practice suffer from a further disadvantage. The clip line is not stopped for a period of time between severing of the clip in the die and renewed engagement of the advance element into the following gap between two clips of the clip line, in the advance direction. If the clip line is subjected to a tensile stress due to the advance movement, it can be pulled back upon separation of the foremost clip from the clip line in the engagement region of the advance element, in opposite relationship to the advance direction, and that impedes or prevents a desired engagement.

SUMMARY OF THE INVENTION

An object of the present invention is to provide a clip conveyor apparatus for conveying a clip line consisting of a plurality of clips in a clipping machine of the kind described above, which is of a simple structure and which allows simple adjustment of the advance length or the advance stroke of the clip line.

In accordance with the invention, to attain the object, there is a conveyor apparatus for conveying a clip line comprising a plurality of clips in a clipping machine, in particular a sausage clipping machine, comprising a drive unit and an advance element that is coupled with its drive end to the drive unit and is drivable by the drive unit in such a way that its conveyor end describes an elliptical path and for stepwise conveyance of the clip line engages into intermediate spaces between two clips of the clip line and conveys the same stepwise in the advance direction.

Furthermore in accordance with the invention in the proposed apparatus, there is provided an adjusting device having a pivot axis about which the advance element is pivotable and which is adjustable in its position without a tool in such a way that at least one of the two axes, major or minor axis, of the elliptical path described by the conveyor end of the advance element is variable. Such an adjusting device permits simple and rapid adaptation of the advance stroke of the advance element to the respective size of clip without a tool having to be used in that respect and/or without the clipping machine having to be at least partially dismantled.

In a preferred configuration, the position of the pivot axis of the adjusting device is adjustable by an eccentric. The pivot axis is thus displaceable on a circular path, whereby, upon a change in the position of the pivot axis, simultaneous adjustment of the advance stroke or the advance length as well as the position of engagement of the conveyor end of the advance element is effected. That adjustment option is advantageous as, with a change in the size of clip, besides the advance stroke, the point of engagement on the clip line also changes.

It will be appreciated that it is also possible to implement adjustability of the position of the pivot axis of the adjusting device by other configurations such as a linear guide. Such a linear guide is simple to produce and is highly reliable by virtue of the choice of a suitable shape. Furthermore, with an appropriate orientation, in terms of adjustability, it affords the same advantages as those referred hereinbefore in relation to an eccentric.

The position of the pivot axis of the adjusting device can be adjusted in various ways. That is advantageously effected from the exterior by an adjusting element so that the adjustment is effected manually.

The advance element may not be fixedly connected to the pivot axis but, in order to correctly perform the desired function, is guided displaceably along the pivot axis. In an advantageous embodiment, the pivot axis of the adjusting device engages into a slot in the advance element. Guidance for the advance element is ensured by this simple and reliable structure.

The drive unit for the advance element can be formed by various drive elements. In a particularly advantageous configuration, the drive unit is an eccentric. The desired elliptical path of the conveyor end of the advance element can be particularly easily produced by the use of an eccentric, and modified in the desired fashion.

In that respect it is further advantageous if the shaft of the drive element rotates about a non-displaceable axis. In the above-described use of an eccentric, the associated eccentric pin or journal rotates on a circular path that is established in space in relation to the pivot axis of the adjusting device. Thus, precisely one given advance stroke is associated with each position of the pivot axis of the adjusting device and an associated point of engagement of the conveyor end of the advance element is also associated therewith.

In a further advantageous configuration of the apparatus according to the invention, the axis of the drive element of the drive unit is additionally so adjustable that at least one of the two axes, major axis or minor axis, of the elliptical path described by the conveyor end of the advance element is variable. By virtue of horizontal and/or vertical displaceability of the axis of the drive element of the drive unit, the circular path of the eccentric pin of the drive element would be correspondingly displaced, which would thereby afford a further adjustment option for adjustment of the advance stroke and the engagement point of the advance element.

The advance of the clip line means that tensile stresses can occur therein. When the foremost clip is cut off, as the clip line is usually only held by the foremost clip in the die, the clip line can be at least partially pulled back in opposite relationship to the advance direction out of the engagement region of the advance element by the above-mentioned tensile stresses, whereby renewed accurate engagement of the advance element is impeded or prevented. The automatically acting retaining device that is further provided and can be brought into engagement with a clip disposed at the front end of the clip line effectively prevents the clip line from slipping back after the clip lying in the die has been severed from the clip line. In that way, correct engagement of the advance element into the clip line is ensured by the position of the clip line that is achieved in that way and which is always identical. It is also to be noted that the retaining device and the advantageous configurations thereof as are described in greater detail hereinafter can also be used independently of the adjusting device described in greater detail hereinbefore, in a clip conveyor apparatus of the general kind set forth, as the possibility of adjusting the clip conveyor apparatus to different clip sizes is independent of the problem of holding the clip line in position after a conveyor or advance step.

The retaining device can be embodied in various ways. A particularly advantageous configuration is achieved if, besides the first clip pocket fixing the first clip of the clip line in the closure operation, provided on the die is a recess or second clip pocket in which preferably the clip directly following the foremost clip is held, wherein force-application means for applying a fixing force act on that clip. The force-application means can be formed for example by a clip guide disposed on the top side of the clip line and applies the holding force to the clip which is in the second pocket of the die.

In a further advantageous configuration of the apparatus according to the invention, the retaining device is formed by a hook, for example can be arranged parallel beside or beneath the clip line. That hook, oriented in opposite relationship to the advance direction, could be brought out of engagement with the clip line for example by the vertical stroke movement of the clip line in the advance process and can engage into the clip line again in the downward movement of the clip line after the advance movement has taken place. The clip line is securely fixed by such a hook and the clip line is prevented from slipping back in opposite relationship to the conveyor direction after severing of the clip which is in the die.

The retaining device can also be formed by a hydraulic or pneumatic cylinder.

Further advantageous configurations and an embodiment by way of example of the invention are described in greater detail hereinafter with reference to the accompanying drawings. The terms "top", "bottom", "left" and "right" used in the description of the specific embodiment relate to the Figures in an orientation with the reference numerals and the Figure legends being normally readable.

BRIEF DESCRIPTION OF THE DRAWING FIGURES

Figure 2:
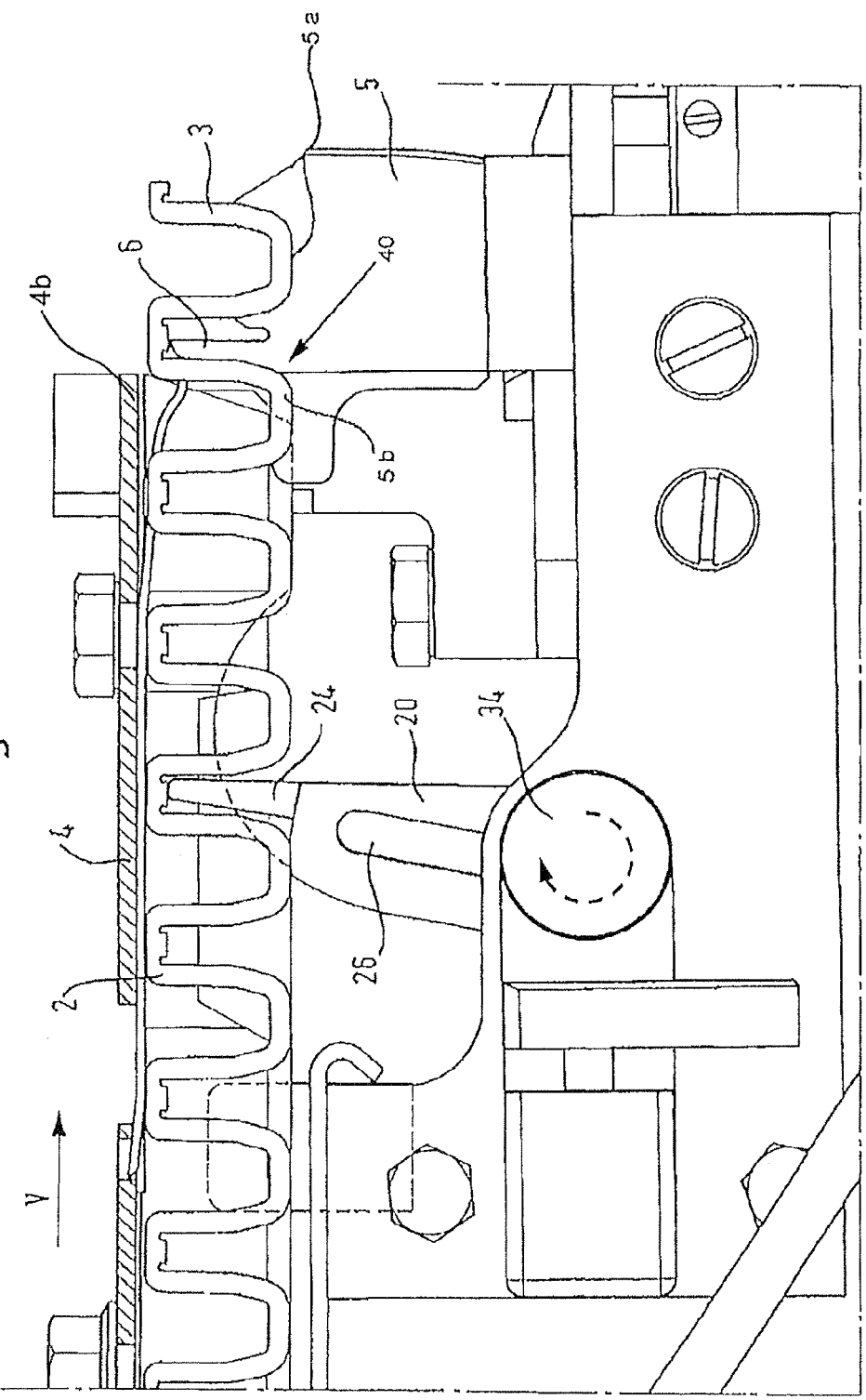
Figure 3:
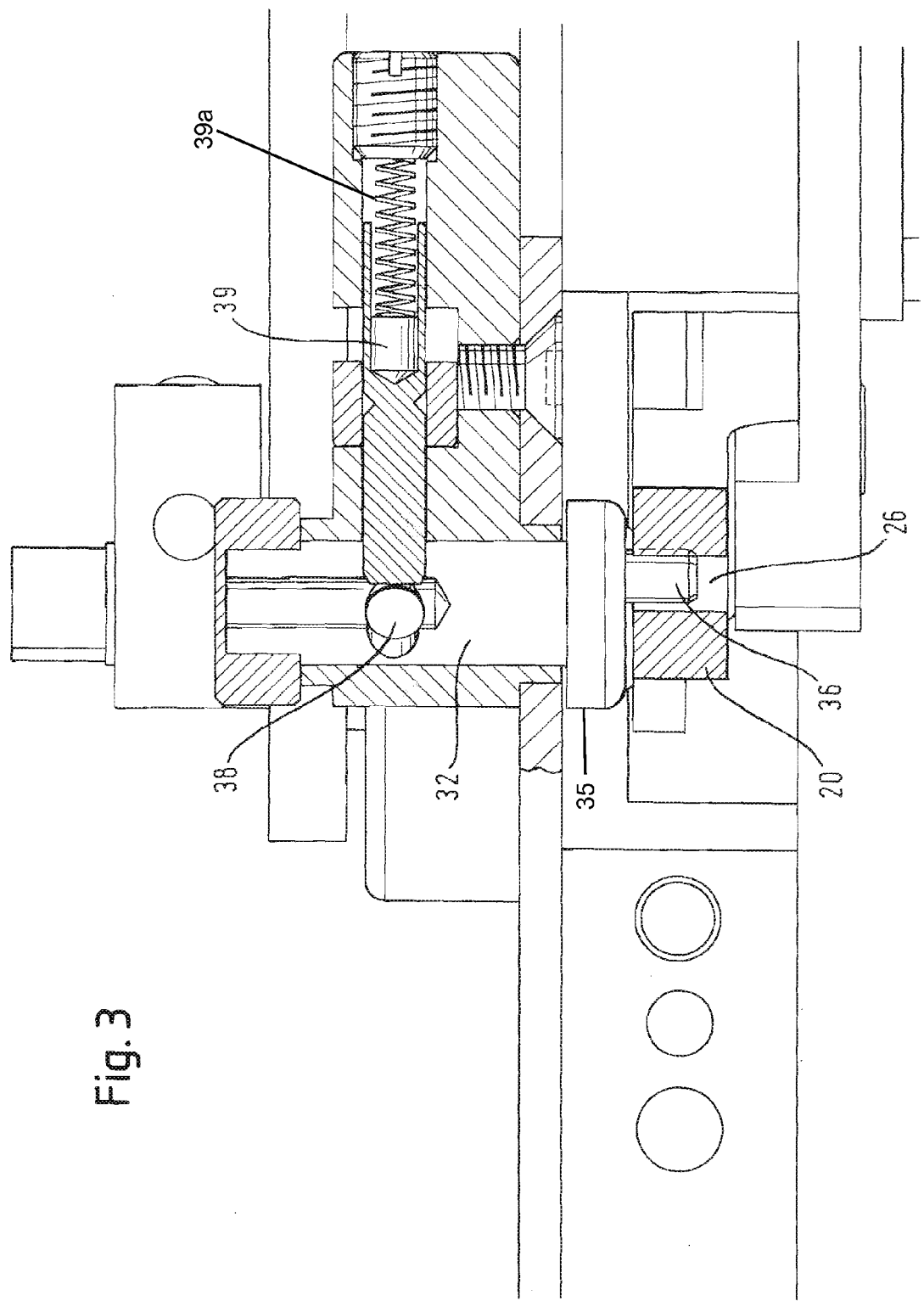
Figure 4:
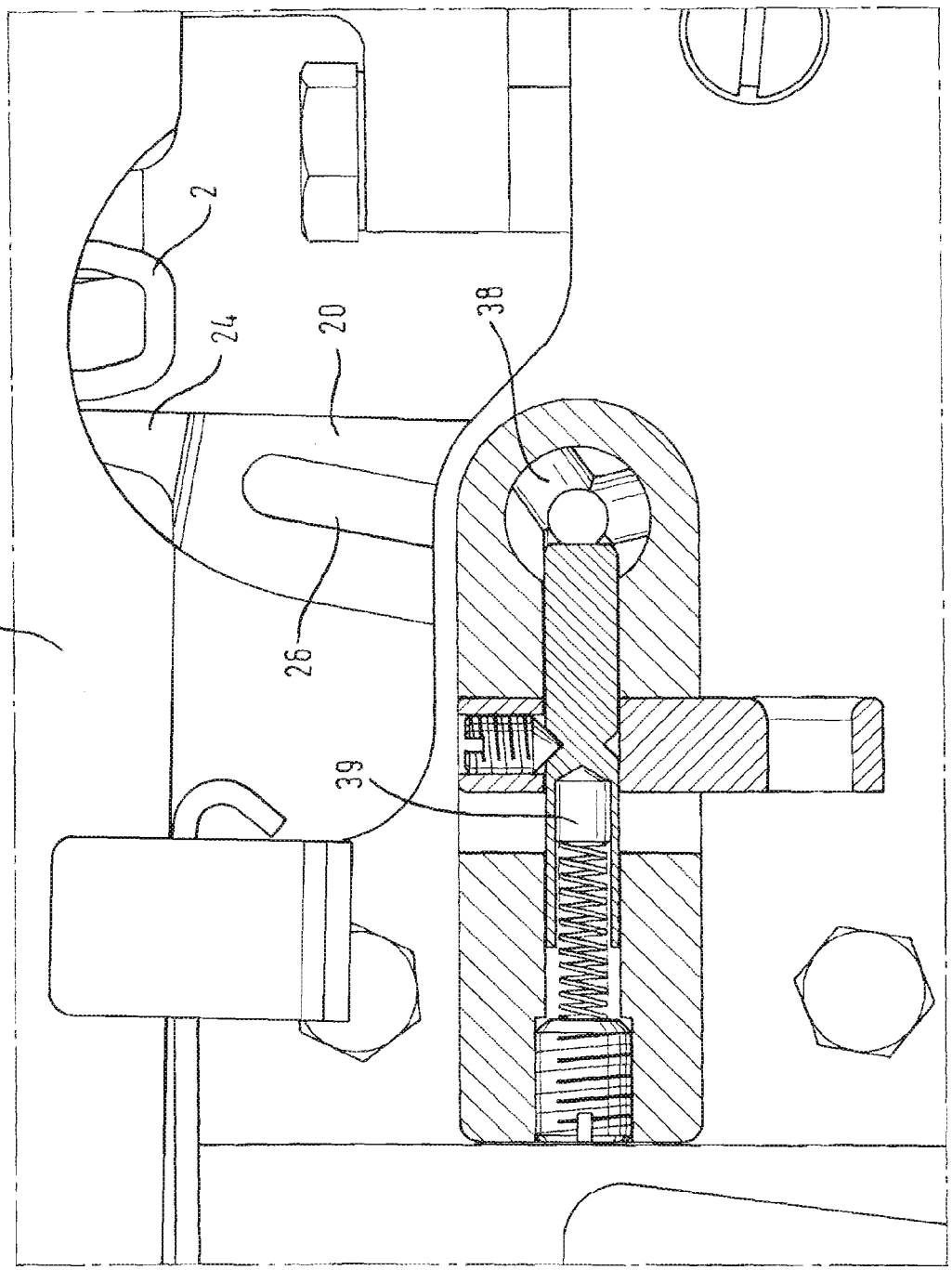

FIG. 1 shows a side view from the right of the structure in principle of the clip conveyor apparatus in a clipping machine, FIG. 2 shows a side view from the left of the clip conveyor apparatus according to the invention, FIG. 3 shows a horizontal view in section of the clip conveyor apparatus according to the invention, and FIG. 4 shows a vertical view in section of the clip conveyor apparatus according to the invention.

DETAILED DESCRIPTION

The embodiment described hereinafter of a clip conveyor apparatus according to the invention is used in for example sausage clipping machines. As can be seen from FIG. 1 the clip conveyor apparatus 1 includes a drive unit 10, an advance or transport element 20, an adjusting device 30 and a retaining device 40.

The drive unit 10, which in the illustrated embodiment has an eccentric as the drive element, is disposed beneath the horizontally extending clip line 2 that is guided in a clip guide 4. The eccentric is mounted on a rotatably mounted drive shaft 12. The eccentric is arranged in rotationally and axially fixedly mounted relationship in such a way that its eccentric pin or journal describes a circle extending in the plane of FIG. 1. The eccentric can be caused to rotate for example by a belt or chain drive (not further shown), which is driven by the main machine drive or by the main machine shaft. It is equally possible for the drive of the eccentric to be driven by a hydraulic or pneumatic cylinder (also not shown) or by an electric motor (once again not shown). It usually comprises stainless steel.

The clip guide 4 can be formed by a horizontally extending, downwardly open, substantially U-shaped profile member. The clip line 2 is held therein displaceably in the advance direction V and is prevented from slipping off laterally (see FIG. 1). The clip guide 4 has a pivot point (not shown) that allows it to be raised and lowered again together with the clip line 2 when the advance element 20 performs an advance step which is described in greater detail hereinafter.

The substantially vertically arranged, elongate and lever-like advance element 20 comprises an approximately parallelepipedic flat material, the main plane in which it extends being in the plane of FIG. 1. The advance element 20 also preferably comprises stainless steel. At its drive end 22 it has an eye, by way of which it is axially fixedly connected to the eccentric pin 14 and rotatably about the longitudinal axis thereof to the drive unit 10. The conveyor end or the conveyor tooth 24 of the advance element 20 is formed by an also parallelepipedic flat material, which however is arranged perpendicularly to the main plane in which the advance element 20 extends. Provided in the upper half of the transport element 20 is a slot 26 which extends centrally on the transport element 20 and in the longitudinal direction thereof.

As can be seen from FIG. 3, the adjusting device 30 comprises a shaft 32 that is mounted rotatably in the clip lever 20 and to the end of which, that is the upper end in the illustration, there is mounted an adjusting element 34, by means of which the shaft 32 can be rotated about its longitudinal axis. An eccentric 35 is formed on the shaft 32 at the end thereof in opposite relationship to the adjusting element 34. The eccentric 35 has an eccentric pin 36 that extends in axis-parallel relationship with the shaft 32 and is oriented in the direction of the advance element 20. Also provided in the shaft 32 of the adjusting device 30 are latching devices in the form of radially arranged bores 38, into which a spring-loaded securing element 39 (not described in greater detail) engages in order to fix the selected position of the adjusting device 30 and to secure it to prevent unintended displacement (see FIG. 4).

The adjusting device 30 is arranged in the region of the slot 26 of the advance element 20 and substantially perpendicularly over the drive unit 10. The axis of the shaft 32 of the adjusting device 30 extends horizontally in and perpendicularly to the advance direction V. The eccentric pin 36, which faces towards the advance element 20, engages into the slot 26 and thus forms the pivot axis 36 for the transport element 20. The adjusting device 30 is also preferably made from stainless steel.

As the adjusting element 34 shown in FIG. 2 scarcely experiences any mechanical loadings, it can also be made for example from aluminum and can have a surface of a suitably grippy nature in order to further facilitate manual adjustment of the clip size. As can also be seen from FIG. 2, a labeling corresponding to the clip sizes which can be set can be provided on the adjusting element 34.

The retaining device 40 for the clip line 2 is formed in the illustrated embodiment firstly by a second pocket 5b provided on the die 5 beside the first pocket 5a thereof, which holds a clip 3 to be closed (the first clip in the clip line), the second pocket 5b being to the left of the shearing edge 6 of the die 5 as can be seen from FIG. 2. As can also be seen from FIG. 2, the second clip 3 directly following the first clip 3 is arranged in that second pocket 5b. So that the second clip 3 directly following the first clip remains disposed in the second pocket 5b of the die 5, the clip guide 4 further extends to over that second clip 3 as can also be seen from FIG. 2. In particular the horizontally extending upper end plate portion 4b of the clip guide 4 presses onto the clip 3 disposed in the second pocket 5b of the die 5 so that the clip line is not pulled back in opposite relationship to the advance direction V when the advance element 20 comes out of engagement. As finally can also be seen from FIG. 2, the second pocket 5b is of the same configuration as the first pocket 5a, that is to say its bottom contour configuration corresponds to that of a clip 3. It is also to be noted that FIGS. 1 and 2 show a leaf spring that has previously been used in the state of the art and can optionally additionally be provided here. However, the retaining device 40 according to the invention that, as already mentioned hereinbefore, can be used independently of the adjusting device 30 in a clip conveyor apparatus of the general kind set forth, is no longer reliant on that leaf spring. Rather, the second pocket 5b of the die 5 and the clip guide 4 are sufficient.

The sequence of movements of the apparatus according to the invention is described hereinafter with reference to the advance of a clip from the condition shown in FIG. 1: As shown in FIG. 1 a clip 3 is disposed in the die 5. That clip 3 is still connected to the clip line 2 by way of a leg (not identified). The conveyor end 24 of the advance element 20 is in engagement with the clip line 2. It projects from below between two adjacent clips 3 connected together by way of a leg and urges that leg against the clip guide 4. In the illustrated position the clip line 2 is prevented from slipping by the clip 3 disposed in the die 5, the retaining device 40 and the conveyor end 24 of the advance element 20.

In the further course of the manufacturing process, for example of a sausage product, the drive unit 10 rotates clockwise about the axis of rotation of the shaft 12, in the direction indicated by A in FIG. 1. In that situation, the drive end 22 of the advance element 20 describes a circle which is in the plane of FIG. 1. Approximately at the moment at which the eccentric pin 14 of the drive unit 10 crosses a horizontally extending notional line through the axis of the rotary shaft 12, to the right of that axis, the conveyor end 24 of the advance element 20 is out of engagement with the clip line 2. In the further course of the rotation of the drive unit 10 the advance element 20 is moved downwardly by virtue of guidance by the pivot axis 36 in the slot 26 and is pivoted about the pivot axis 36. Because of that arrangement, upon a rotation of the drive unit 10 in the clockwise direction, the conveyor end 24 of the advance element 20 describes an elliptical path in the counter-clockwise direction. While the eccentric pin 14 describes the lower half of the circular path around the axis of the rotary shaft 12 of the drive unit 10, beginning from the right, the conveyor end 24 of the advance element 20 moves on the lower half of the elliptical path from left to right. When that happens, it comes out of engagement with the clip line 2 and moves with a motion corresponding to the elliptical path downwardly and upwardly again in order once again to engage into the clip line 2, being displaced towards the right by the length of the horizontally extending axis of the ellipse.

At the same time as the above-described movement of the advance element 20 the die 5 and a ram (not shown) of the closure tools of the clipping machine are brought together in order to close the plait portion (not shown) of packaging casing material, which is laid in the clip 3. When the die 5 and the ram (not shown) are brought together, the clip 3 is sheared off the clip line 2 by the co-operation of the shearing edge 6 of the die 5 and a corresponding shearing edge of the ram and compressed around the plait portion of packaging casing material, which is in the clip 3, in order to close it. In that case the retaining device 40 prevents the clip line 2 from slipping back in opposite relationship to the advance direction V by virtue of the support afforded for the limb, which faces towards the die 5, of the front clip 3 of the clip line 2. The sausage product in the finished closed condition is transported out of the clipping machine.

In the further course of the manufacturing process for a sausage product, the eccentric pin 14 of the drive unit 10 describes the upper half of the circular path. After passing across the horizontally extending notional line through the axis of the rotary shaft 12, to the left of that axis of the drive unit 10, the conveyor end 24 of the advance element 20, which is now in engagement with the clip line 2, again moves from right to left on the upper half of the elliptical path. In that case the clip line 2 together with the clip guide 4 is lifted and lowered again into the illustrated position. During the lifting and lowering movement of the clip guide 4 the clip line 2 is displaced towards the left in the guide 4 by the length of the horizontally extending axis of the ellipse or by clip length, and the front clip 3 is conveyed beyond the shearing edge 6 into the first pocket 5a of the die 5 and the second clip 3 immediately following same is conveyed into the second pocket 5b of the die 5 which, together with the clip guide 4, forms the retaining device 40.

The initial situation shown in FIG. 1 is regained and the described series of movements begins from the start.

In regard to clip size adjustment, for the above-described manufacturing procedure, firstly a clip line 2 was fitted into the clipping machine and the adjusting element 34 rotated into the appropriate position corresponding to the size of the fitted clips. If, for a further manufacturing procedure, for example the diameter of the sausage products to be manufactured is altered, it is generally necessary, besides other closure tools, also to use clips of a different size. Such clips not only involve a different length of clip limb but they are mostly also different in width so that adaptation of the clip advance has to be implemented.

That adaptation is in turn effected by manual actuation of the adjusting element 34, shown in FIG. 2, of the adjusting device 30. For that purpose the adjusting element 34 has a pitch graduation corresponding to the clip sizes which can be selected. The desired clip size is set by rotating (illustrated by clockwise dotted arrow of FIG. 1) the adjusting element 34. By rotation (illustrated by clockwise dotted arrow of FIG. 2) of the adjusting element 34, the pivot axis 36 of the advance element 20 is moved on a circular path around the axis of rotation of the shaft 32 of the adjusting device 30 (see FIG. 1). In that case the pivot axis 36 moves both horizontally and also vertically.

By virtue of the displacement of the pivot axis 36, both the advance stroke and also the engagement point of the conveyor end 24 of the advance element 20 are altered.

Vertical displacement of the pivot axis 36 downwardly increases the upper lever length of the advance element 20 and the lower lever length, at the drive side, is correspondingly shortened. As a result the advance stroke of the conveyor end 24 of the advance element 20 is increased. Displacement of the pivot axis 36 upwardly shortens the upper lever portion of the advance element 20 and increases the length of the lower lever portion, whereby the advance stroke of the advance element 20 is reduced.

The horizontal adjustment component causes displacement of the engagement point of the conveyor end 24 of the advance element 20 into the clip line 2, towards the right or the left respectively.

If the pivot axis 36 of the adjusting device 30 is on a notional perpendicular line extending through the axis 12 of the drive unit 10, the conveyor end 24 of the advance element 20 describes an ellipse, the major axis of which also extends through that perpendicular notional line. The point of the highest vertical stroke movement of the clip line 2 is on that line. The engagement point of the conveyor end 24 into the clip line 2 is to the right of that line, corresponding to FIG. 1, and the point at which the conveyor end 24 of the advance element 20 comes out of engagement with the clip line 2 is at the same spacing to the left of that line.

If the pivot axis 36 of the adjusting device 30 is displaced horizontally towards the right, the elliptical path which the conveyor end 24 describes is also displaced towards the right. That means that the engagement point of the conveyor end 24 into the clip line 2 and the point at which the conveyor end 24 of the advance element 20 comes out of engagement with the clip line 2 are correspondingly also displaced towards the right.

Upon displacement of the pivot axis 36 of the adjusting device 30 horizontally towards the left, the same displacement of the elliptical path and thus the above-described engagement points of the conveyor end 24 into the clip line 2 towards the left occurs.

When the pivot axis 36 moves on a circular path, corresponding to the illustrated embodiment, it is however always displaced horizontally and vertically at the same time. The co-operation of both adjustment components additionally provides for a change in the stroke height of the clip line 2 and the clip guide 4.

In order to prevent unwanted displacement of the adjusting device 30, latching elements can be provided, which in the illustrated embodiment are in the form of radially arranged bores 38 in the shaft 32 of the adjusting device 30, into which bores a spring-loaded securing element 39 engages. That securing element 39 is a substantially cylindrical pin which can engage against the force of a spring 39a into one of the radial bores 38 to prevent unwanted rotation of the shaft 32. The spring stress is so selected in that respect that on the one hand it prevents rotation of the shaft 32 by the movement of the advance element 20 but on the other hand it allows intentional displacement by manual actuation of the adjusting element 34.

In the illustrated embodiment there are three radial bores on the shaft 32, for adaptation of the clip size setting to three different clip sizes. It will be appreciated that it is possible to provide any number of latching positions for the securing element 39 to provide for suitable adaptation of the clip size setting to any varying number of clip sizes.

Finally it should also be noted that the invention is not limited to the embodiment shown in FIGS. 1 and 2. It is for example conceivable for the advance element 20 to substantially consist of a hollow profile member in order for example to achieve a reduction in the moved mass, whereby vibration in the clipping machine can be reduced.

The retaining device 40 can also be in the form of a piston-cylinder arrangement, in which case then the piston is moved hydraulically or pneumatically into the appropriate position, instead of the second pocket 5b, shown in FIGS. 1 and 2, of the die 5 and the clip guide 4. Electric drives can also be used instead of hydraulic or pneumatic drives.

Likewise the pivot axis 36 can be adjustable by a linear guide. By means of a suitable arrangement of the linear guide, the horizontal and the vertical adjustment components can then be differently weighted or one of the two can be entirely eliminated.

It is also possible for fixing of the clip line 2 to be effected not exclusively by the retaining device 40.

The latching elements can be so designed that they latch audibly and/or perceptibly by feel, thereby facilitating accurate setting of the desired clip size. It can also be provided that the securing element 39 is so designed that it is actuable from the exterior, for example by an actuating element on the machine. By virtue thereof a higher spring stress for the arresting action can be selected and thus a more secure arresting effect can be achieved.

The invention claimed is:

1. A clip conveyor apparatus for conveying a clip line having a plurality of clips in a clipping machine, the clip conveyor apparatus comprising:
   said clip line having said plurality of clips in said clipping machine;
   a drive unit for said clip line having a plurality of clips in said clipping machine, said drive unit comprising an eccentric pivot axis and a fixed pivot axis;
   an advance element having a drive end and a conveyor end, the drive end of the advance element being coupled to the drive unit and drivable by the drive unit to move the conveyor end in an elliptical path and, for stepwise conveyance of the clip line, engages into intermediate spaces between adjacent clips of the clip line and conveys the clip stepwise in the advance direction; and
   an adjusting device slidably engaging a longitudinal slot in said advance element, said adjusting device having a pivot axis about which the advance element is pivotable, the position of the adjusting device being vertically and horizontally adjustable simultaneously in its position to vary at least one of the axes of the elliptical path of the conveyor end.

2. The clip conveyor apparatus of claim 1 where the position of the pivot axis of the adjusting device is adjusted by an eccentric.

3. The clip conveyor apparatus of claim 1 where the pivot axis of the adjusting device engages into a slot in the advance element.

4. The clip conveyor apparatus of claim 1 where the drive unit includes at least one eccentric.

5. The clip conveyor apparatus of claim 4 where the drive unit rotates about a fixed axis.

6. The clip conveyor apparatus of claim 5 where the fixed axis of the drive unit is movable to vary at least one of the axes of the elliptical path described by the conveyor end of the transport element.

7. The clip conveyor apparatus of claim 1 further comprising:
   an automatically acting retaining device capable of being brought into engagement with a clip disposed at the front end of the clip line.

8. The clip conveyor apparatus of claim 7 where the retaining device is a recess on a die and a means for applying a pressure force applied substantially perpendicularly to the advance direction on the clip line.

* * * * *